US009338805B2

(12) United States Patent
Cheng

(10) Patent No.: US 9,338,805 B2
(45) Date of Patent: May 10, 2016

(54) METHOD AND APPARATUS FOR STANDBY WITH A DUAL-STANDBY MODEM AND ESTABLISHING SINGLE CONNECTION FOR ONE SUBSCRIBER IDENTITY CARD

(71) Applicant: MEDIATEK, INC., Hsin-Chu (TW)

(72) Inventor: Chao-Hsun Cheng, Taoyuan County (TW)

(73) Assignee: MEDIATEK, INC., Hsin-Chu (TW)

( * ) Notice: Subject to any disclaimer, the term of this patent is extended or adjusted under 35 U.S.C. 154(b) by 213 days.

(21) Appl. No.: 14/078,802

(22) Filed: Nov. 13, 2013

(65) Prior Publication Data
US 2014/0140287 A1 May 22, 2014

Related U.S. Application Data

(60) Provisional application No. 61/727,225, filed on Nov. 16, 2012.

(51) Int. Cl.
*H04W 76/02* (2009.01)
*H04W 72/04* (2009.01)
(Continued)

(52) U.S. Cl.
CPC ............ *H04W 76/02* (2013.01); *H04W 72/042* (2013.01); *H04W 76/026* (2013.01); *H04W 72/0413* (2013.01); *H04W 72/0446* (2013.01); *H04W 84/12* (2013.01); *H04W 88/06* (2013.01)

(58) Field of Classification Search
CPC .................................................. H04W 76/02
USPC .......... 370/328, 329, 230, 331, 389; 455/437, 455/435.1, 435.2
See application file for complete search history.

(56) References Cited

U.S. PATENT DOCUMENTS 5,903,557 A * 5/1999 Johansson ............. H04L 1/1685
370/349
6,002,681 A * 12/1999 Bellenger ........... H04M 11/062
370/352

(Continued)

FOREIGN PATENT DOCUMENTS

| CN | 101204114 A | 4/2005 |
|---|---|---|
| CN | 101009650 A | 1/2006 |
| EP | 1182900 A1 | 8/2000 |

OTHER PUBLICATIONS

International Search Report and Written Opinion of International Search Authority for PCT/CN2013/087328 dated Feb. 27, 2014(11 pages).

*Primary Examiner* — Andrew Lai
*Assistant Examiner* — Andrew C Lee
(74) *Attorney, Agent, or Firm* — Imperium Patent Works; Zheng Jin

(57) ABSTRACT

A method of PS path selection is provided. A single SIM card with dual standby feature UE is equipped with a first modem operated in a first RAT for both PS and CS services, and a second modem operated in a second RAT for PS only service. The UE camps on a cell using the first modem in a mobile communication network. The UE attaches to the network for PS service using the second modem. The UE also selects the second modem to form a PS path for routing PS data via the second modem. The UE then triggers CS service via the first modem. The UE switches the PS path from the second modem to the first modem upon triggering the CS service if the first modem allows simultaneous PS and CS service. After the CS service is terminated, the UE optionally triggers the second modem recovery mechanism.

20 Claims, 10 Drawing Sheets

PS PATH SELECTION WITH ONGOING PS SERVICE – EMBODIMENT 2

(51) Int. Cl.
*H04W 88/06* (2009.01)
*H04W 84/12* (2009.01)

(56) References Cited

U.S. PATENT DOCUMENTS

| | | | | |
|---|---|---|---|---|
| 6,654,348 | B1* | 11/2003 | Doty, II | H04L 12/2697 370/244 |
| 7,197,330 | B1* | 3/2007 | Monroe et al. | 455/557 |
| 7,995,562 | B2* | 8/2011 | Purnadi et al. | 370/352 |
| 2003/0031150 | A1* | 2/2003 | Yukie | H04L 12/5692 370/338 |
| 2006/0165033 | A1* | 7/2006 | Vaittinen et al. | 370/328 |
| 2006/0245395 | A1 | 11/2006 | Jain et al. | 370/331 |
| 2006/0246906 | A1* | 11/2006 | Vaittinen et al. | 455/442 |
| 2006/0291455 | A1* | 12/2006 | Katz et al. | 370/355 |
| 2007/0121640 | A1* | 5/2007 | Wang | H04L 12/2801 370/395.1 |
| 2007/0155386 | A1 | 7/2007 | Wahl et al. | 455/436 |
| 2007/0259667 | A1* | 11/2007 | Kim | H04W 36/0066 455/440 |
| 2007/0293251 | A1* | 12/2007 | Bienas et al. | 455/466 |
| 2008/0081663 | A1* | 4/2008 | Kasslin | H04B 1/406 455/557 |
| 2008/0089293 | A1* | 4/2008 | Madour et al. | 370/331 |
| 2009/0010247 | A1* | 1/2009 | Stille | 370/352 |
| 2009/0180451 | A1* | 7/2009 | Alpert et al. | 370/338 |
| 2009/0190549 | A1* | 7/2009 | Kim | H04W 36/0066 370/331 |
| 2009/0233600 | A1* | 9/2009 | Johansson et al. | 455/435.2 |
| 2009/0247165 | A1* | 10/2009 | Chen et al. | 455/436 |
| 2010/0111002 | A1* | 5/2010 | Xu et al. | 370/329 |
| 2010/0296419 | A1* | 11/2010 | Kim et al. | 370/297 |
| 2010/0309886 | A1* | 12/2010 | Vikberg et al. | 370/332 |
| 2010/0325335 | A1* | 12/2010 | Kim et al. | 710/316 |
| 2011/0103574 | A1* | 5/2011 | Anschutz | H04B 3/32 379/406.06 |
| 2011/0149907 | A1* | 6/2011 | Olsson et al. | 370/331 |
| 2011/0176680 | A1* | 7/2011 | Wu | H04W 12/04 380/277 |
| 2011/0261796 | A1* | 10/2011 | Moeller et al. | 370/338 |
| 2011/0268083 | A1* | 11/2011 | Ostrup et al. | 370/331 |
| 2011/0299429 | A1* | 12/2011 | Tiwari | 370/259 |
| 2012/0027059 | A1* | 2/2012 | Zhao et al. | H04W 68/00 375/222 |
| 2012/0069823 | A1* | 3/2012 | Low et al. | 370/335 |
| 2012/0147850 | A1* | 6/2012 | Zheng | 370/331 |
| 2012/0258716 | A1* | 10/2012 | Ahn | H04W 88/06 455/436 |
| 2012/0270545 | A1* | 10/2012 | Zhao et al. | 455/435.1 |
| 2012/0322502 | A1* | 12/2012 | Song et al. | 455/553.1 |
| 2013/0012266 | A1* | 1/2013 | Duan | H04W 8/183 455/558 |
| 2013/0045743 | A1* | 2/2013 | Zisimopoulos et al. | 455/436 |
| 2013/0059586 | A1* | 3/2013 | Hao et al. | 455/436 |
| 2013/0148574 | A1* | 6/2013 | Liu | H04W 36/08 370/328 |
| 2013/0150052 | A1* | 6/2013 | Zisimopoulos et al. | 455/437 |
| 2013/0182560 | A1* | 7/2013 | Den Hartog | H04L 12/287 370/225 |
| 2013/0196628 | A1* | 8/2013 | Wei | H04W 8/26 455/411 |
| 2013/0223335 | A1* | 8/2013 | Kwag et al. | 370/328 |
| 2013/0231098 | A1* | 9/2013 | Jonas et al. | 455/418 |
| 2013/0279470 | A1* | 10/2013 | Sen et al. | 370/331 |
| 2013/0328996 | A1* | 12/2013 | Rawat | H04N 7/14 348/14.02 |
| 2014/0018079 | A1* | 1/2014 | Xing et al. | 455/437 |

* cited by examiner

PS PATH SELECTION WITH NO ONGOING PS SERVICE

PS PATH SELECTION WHEN NO ONGOING PS SERVICE – EMBODIMENT 1

PS PATH SELECTION WHEN NO ONGOING PS SERVICE – EMBODIMENT 2

PS PATH SELECTION WITH ONGOING PS SERVICE – EMBODIMENT 1

PS PATH SELECTION WITH ONGOING PS SERVICE –
EMBODIMENT 2

FLOW CHART OF METHOD FOR PS PATH SELECTION

METHOD AND APPARATUS FOR STANDBY WITH A DUAL-STANDBY MODEM AND ESTABLISHING SINGLE CONNECTION FOR ONE SUBSCRIBER IDENTITY CARD

CROSS REFERENCE TO RELATED APPLICATIONS

This application claims priority under 35 U.S.C. §119 from U.S. Provisional Application No. 61/727,225, entitled "Method for standby with a dual-standby capable modem and establishing single connection for one subscriber identity card and apparatus using the same," filed on Nov. 16, 2012, the subject matter of which is incorporated herein by reference.

TECHNICAL FIELD

The disclosed embodiments relate generally to mobile communication networks, and, more particularly, to UE standby with a dual-standby modem and establishing a single connection for one SIM card.

BACKGROUND

In mobile cellular telephony networks, voice connections are provided by Circuit Switched (CS) service and data connections are provided by Packet Switched (PS) service. User equipments (UEs) use different types of modems to connect to the network via different radio access technologies (RATs). For example, a modem can be operated in GSM (briefly 2G), WCDMA/CDMA2000/TDS-CDMA (briefly 3G), or WiMAX/LTE/TD-LTE (briefly 4G). If a UE is equipped with dual-standby capable modem, then the UE is able to access the network via different RATs.

Dual-SIM Dual-Standby (DSDS) is a very popular feature in smart phone markets today, especially in developing countries such as China and India. Many mobile phone users have multiple SIM cards for various purposes—having different phone numbers for different uses (e.g., one for business and one for personal), saving roaming fee, compensating non-contiguous network coverage, and sharing one device for multiple family members. With DSDS feature, mobile phone users can use single device to enjoy multiple SIM services. For DSDS UE, however, there is PS service continuity issue. The registration information of each SIM of a DSDS UE is independent in the network. When PS service is preempted by higher priority CS service, the PS path may be switched from a first modem to a second modem. As a result, it is not possible to reuse the same registration information after PS path switch because the IP address may change after PS path switch and result in the termination of the PS connection.

As an alternative to DSDS, some UEs may be equipped with dual-standby capable modem supporting a single SIM card. For example, a UE has a first modem that supports both PS and CS services and a second modem that supports only PS service. The UE may be configured to enter a standby mode for the two modems to listen to 2G/3G and 4G mobile terminated (MT) paging messages. The UE may also be configured to connect to the cellular network for PS or CS transceiving for only one of the modems at one time using shared RF resource, e.g., an antenna, a radio frequency (RF) module, or the combination thereof. The PS service could be interrupted when a CS connection is to be established, and MT CS paging messages can be listened while data transceiving of PS service is performed. Because the UE only has one SIM card, a SIM proxy may be implemented to read or write data from or to the SIM card for one of the modems. In addition, for sharing the RF resource, a radio frequency scheduler (RFS) is implemented to control the shared RF resource for data transceiving of one of the modems.

FIG. 1 (Prior Art) illustrates service control examples by a UE having single SIM card and dual-standby feature in a mobile communication network 100. The UE is equipped with a first modem supporting CS service and a second modem supporting PS service. In step 111, the UE establishes a mobile-originated (MO) CS connection via the first modem. During the MO CS call, the UE receives a paging message for PS service (step 112). Because CS call has higher priority over PS service, the UE rejects the PS service request (step 113). After the MO CS call is terminated, the UE receives another paging message for PS service (step 114). In step 115, the UE establishes a PS connection for PS service via the second modem. In step 116, the UE receives a paging message for MT CS service. Because CS call has higher priority over PS service, the UE establishes an MT CS connection in step 117 via the first modem and suspends the PS service. Upon completion of the MT CS call, the UE resumes the PS service in step 118 via the second modem. In step 119, the UE initiates an MO CS call and establishes an MO CS connection in step 120 via the first modem while suspending the PS service again. Upon completion of the MO CS call, the UE resumes the PS service in step 121 via the second modem. In step 122, the UE performs a CS location update (LU) procedure because of entering new location area. CS LU procedure also has higher priority over PS service. In step 123, the UE performs CS LU procedure via the first modem and suspend the PS service. Upon completion of the CS LU procedure, the UE resumes the PS service in step 124 via the second modem. It can be seen that the second modem may arrange PS data transceiving discontinuously, enable the first modem to listen to MT CS paging, initiate MO CS call, perform LU procedure, etc. with the aid of RFS.

In the Example of FIG. 1, the first modem supports only CS service, while the second modem supports only PS service. In some other scenarios, the first modem may allow both CS and PS services simultaneously. For example, a modem operating in 3G RAT allows both CS and PS service at the same time. Furthermore, the two modems may offer different data rate for PS service. For example, a modem operating in 4G RAT (e.g., LTE) can provide in excess of 100 Mbps peak data rate in DL and 50 Mbps in UL, which is much faster than 3G RAT. Therefore, for UEs with single SIM card and dual-standby feature, it is desirable to find a solution to fully utilize the different capabilities of the modems to maintain PS service continuity and provide higher PS data rate, while still guarantee the higher priority of CS service.

SUMMARY

A method of PS path selection is provided. A single SIM card with dual standby feature UE is equipped with a first modem operated in a first RAT for both PS and CS services, and a second modem operated in a second RAT for PS only service. The UE camps on a cell using the first modem in a mobile communication network. The UE attaches to the network for PS service using the second modem. The UE also selects the second modem to form a PS path for routing PS data via the second modem. The UE then triggers CS service via the first modem. The UE switches the PS path from the second modem to the first modem upon triggering the CS service if the first modem allows simultaneous PS and CS service. After the CS service is terminated, the UE optionally triggers the second modem recovery mechanism.

In one embodiment, the UE switches the PS path to the first modem by deactivating the second modem, detach from the network by the second modem, and then attach to the network for PS service using the first modem. In another embodiment, the UE switches the PS path to the first modem by performing Location Registration (LR) (e.g. Routing Area Update (RAU)) and retrieving previously registered PS context using the first modem. By selecting and switching the PS path properly via different modems, the UE is able to separate CS and PS service, to perform PS service with higher PS data rate, and to maintain PS service continuity while simultaneously performing higher priority CS service.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
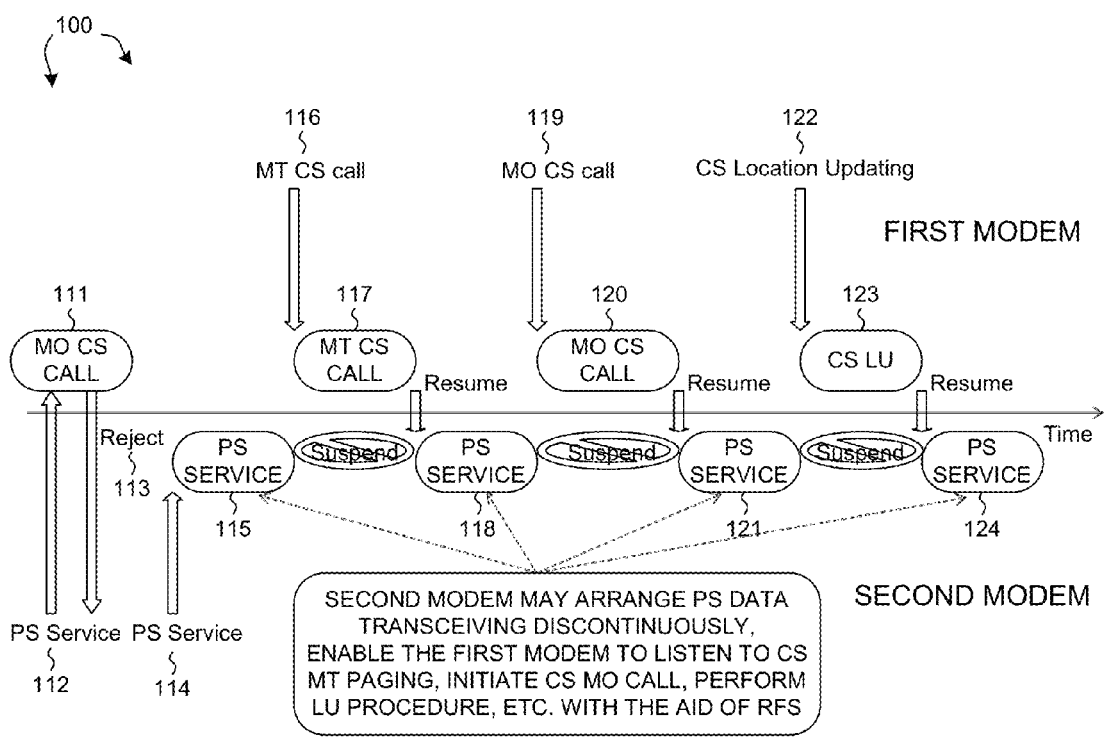
FIG. 1 (Prior Art) illustrates service control examples by a UE having single SIM card and dual-standby feature in a mobile communication network.
Figure 2:
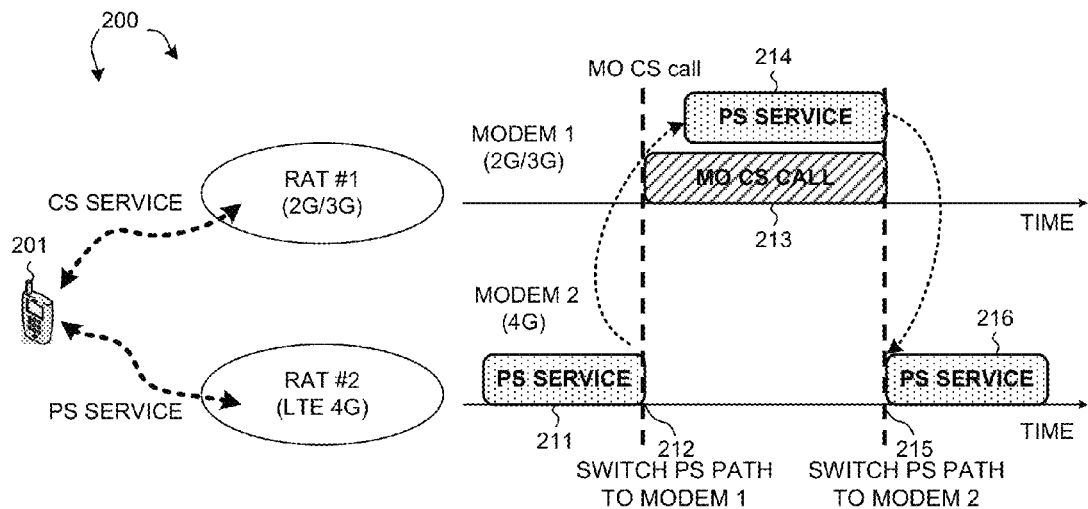
FIG. 2 illustrates a user equipment (UE) having single SIM card and dual standby feature in accordance with one novel aspect.

FIG. 2 illustrates a user equipment (UE) 201 having a single SIM card and dual standby feature in a mobile communication network 200 in accordance with one novel aspect. UE 201 is equipped with two modems capable of supporting dual-standby feature. UE 201 uses different modems operated in different radio access technologies (RATs) to access the network for Circuit Switched (CS) service and/or Packet Switched (PS) service. The different RATs may include GSM (briefly 2G), WCDMA/CDMA2000/TDS-CDMA (briefly 3G), or WiMAX/LTE/TD-LTE (briefly 4G). For example, the first modem (Modem 1) may support both PS and CS services via 2G/3G while the second modem (Modem 2) may support only PS service with a higher PS data rate via 4G. When UE 201 is configured to enter a standby mode, the two modems are configured to listen to both 2G/3G and 4G Mobile Terminated (MT) paging messages via corresponding RATs. Because UE 201 has only one SIM card and shared radio frequency (RF) resource, UE 201 is configured to connect to the network for CS or PS data transceiving for only one of the modems at one time using the shared RF resource. Typically, PS service could be interrupted when a higher priority CS connection is to be established, and MT CS paging messages can be listened while data transceiving of PS service is performed.

In one novel aspect, a solution is provided to fully utilize the different capabilities of the modems to maintain PS service continuity and provide higher PS data rate, while still guarantee the higher priority of CS service. As illustrated in FIG. 2, in step 211, UE 201 establishes a PS connection and performs PS service via Modem 2 (4G), which is the default PS path for higher PS data rate. In step 212, UE 201 initiates a Mobile Originated (MO) CS call via Modem 1 (3G). Because the MO CS call has a higher priority than PS service, UE 201 starts perform the MO CS call in step 213 via Modem 1 and suspends the PS service. Because Modem 1 operates in 3G and allows both PS and CS services, in step 214, UE 201 resumes the PS service via Modem 1 after switching the PS path to Modem 1 and retrieving previous registered PS context. In step 215, the MO CS call is terminated. Because Modem 2 operates in 4G, which provides higher PS data rate, UE 201 switches the PS path back to Modem 2. In step 216, UE 201 resumes the suspended PS service via Modem 2 after retrieving previous registered PS context. Therefore, for UE 201 having a single SIM card and dual-standby feature, by selecting the PS path properly, UE 201 is able to separate CS and PS services using different modems, to perform PS service with higher PS data rate, and to maintain PS service continuity while simultaneously performing CS service.

Figure 3:
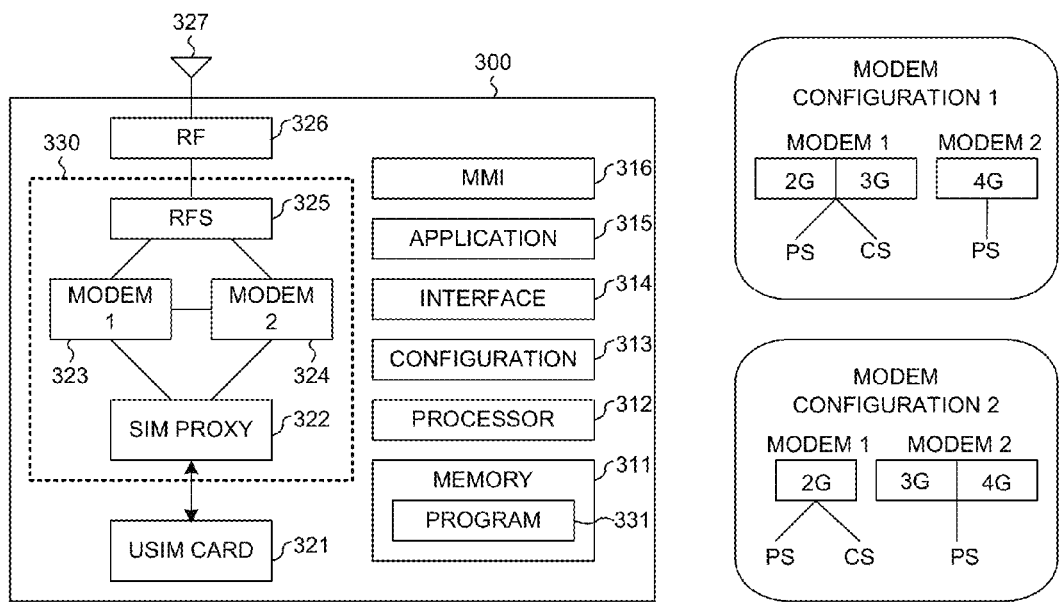
FIG. 3 is a simplified block diagram of a UE having single SIM card and dual standby feature in accordance with one novel aspect.

FIG. 3 is a simplified block diagram of a UE 300 having single SIM card and dual standby feature in accordance with one novel aspect. UE 300 comprises memory 311, a processor 312, a configuration module 313, a data interface 314, an application module 315, and a man-machine interface (MMI) 316. UE 300 also comprises a Universal Subscriber Identity Module (USIM) card 321, a SIM proxy 322, a first modem 323 (Modem 1), a second modem 324 (Modem 2), a Radio Frequency Scheduler (RFS) 325, an RF module 326, and an antenna 327. Memory 311 contains program instructions 331, when executed by processor 312, enables UE 300 to access a mobile communication network for performing both PS and CS services via Modem 1 and Modem 2 using a single USIM card.

The different circuitry and modules may be implemented in a combination of hardware circuit and firmware/software codes being executable by processor 312 to perform desired functions. Configuration module 313 configures the UE to process wireless signals for PS and CS services through interface 314 and the two modems. Application module 315 interacts with a user via MMI 316 and cooperates with the two modems for running various applications. On the RF side, SIM proxy 322 reads and writes data from or to USIM card 321 for one of the modems. RFS 325 controls shared RF resource (e.g., RF module 326 and antenna 327) for data transceiving of one of the modems. In one example, the dual-standby feature may be implemented via a single chip 330 (as shown). In this case, the two modems are actually two logical modems that implemented in a single baseband chipset. In another example, the dual-standby feature may be implemented via two chips (not shown); each includes a separate physical modem connected via cross-chip interface.

As illustrated in FIG. 3, there are two different modem configurations to achieve the dual-standby feature. In modem configuration 1, Modem 1 is operated in two RATs, e.g., 2G and 3G supporting both PS and CS services. Modem 2 is operated in one RAT, e.g., 4G supporting only PS service. When configured to enter standby mode, the two modems are able to listen to 2G/3G and 4G MT paging messages. In modem configuration 2, Modem 1 is operated in one RAT, e.g. 2G supporting both PS and CS services. Modem 2 is operated in two RATs, e.g., 3G and 4G supporting only PS service. When configured to enter standby mode, the two modems are able to listen to 2G and 3G/4G MT paging messages. For both modem configurations, UE 300 is configured to connect to the network for CS or PS data transceiving for only one of the modems at one time using the shared RF resource (e.g., RF module 326 and antenna 327). Because CS service has higher priority over PS service, PS service could be interrupted when a CS connection is to be established for CS service. MT CS paging messages can be listened while data transceiving of PS service is performed. For example, RFS 325 may arrange tasks for listening to MT CS paging messages or performing CS location update (LU) procedure when the shared RF resource is free to use.

Figure 4:
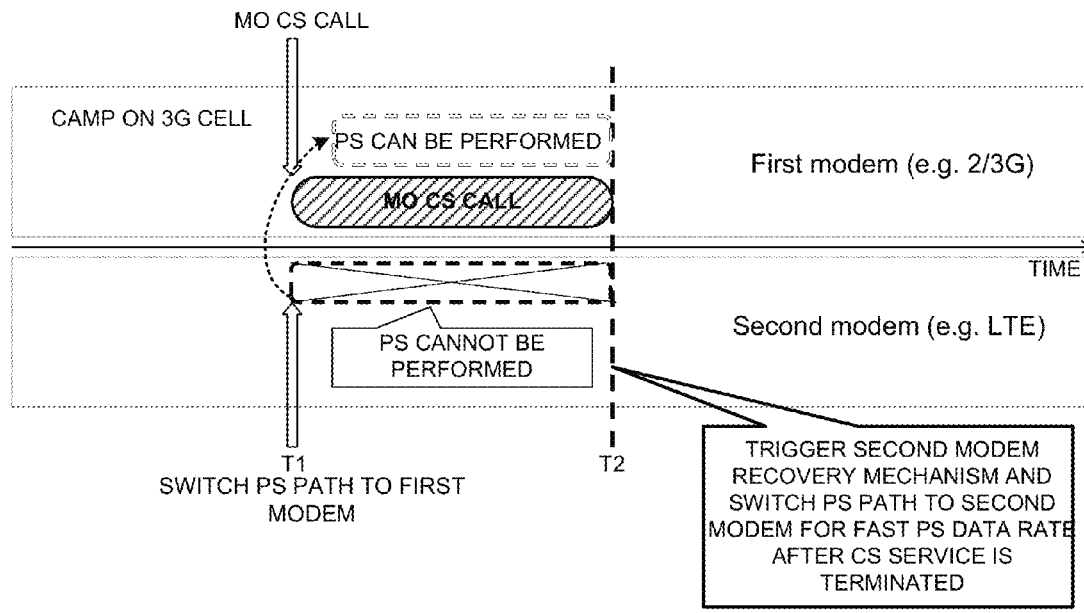
FIG. 4 illustrates embodiments of PS path selection with no ongoing PS service.

FIG. 4 illustrates embodiments of PS path selection with no ongoing PS service. In the example of FIG. 4, a UE is equipped with a first modem operated in 3G RAT for both PS and CS services, and a second modem operated in 4G RAT for PS only service. Initially, the UE camps on a 3G cell via the first modem for performing CS service, while the default PS path is selected to be via the second modem, e.g., the data interface is bind with the second modem so that the following data service can be routed through the second modem. At time T1, the UE initiates an MO CS call via the first modem, and starts to perform the MO CS call during time T1-T2. Because the two modems share the same RF resource, UE is no longer able to perform PS service via the second modem during T1-T2. On the other hand, if the serving RAT (e.g., 3G) of the first modem is allowed to perform both CS and PS services, then it is possible for UE to perform both CS and PS services via the first modem during T1-T2. In accordance with one novel aspect, the UE switches the PS path from the second modem to the first modem at time T1. As a result, PS service can be performed simultaneously with the MO CS call via the first modem during T1-T2. At time T2, the MO CS call is terminated. In accordance with one novel aspect, the UE triggers the second modem recovery mechanism and switches the PS path back to the second modem at time T2 to achieve fast PS data rate.

Figure 5:
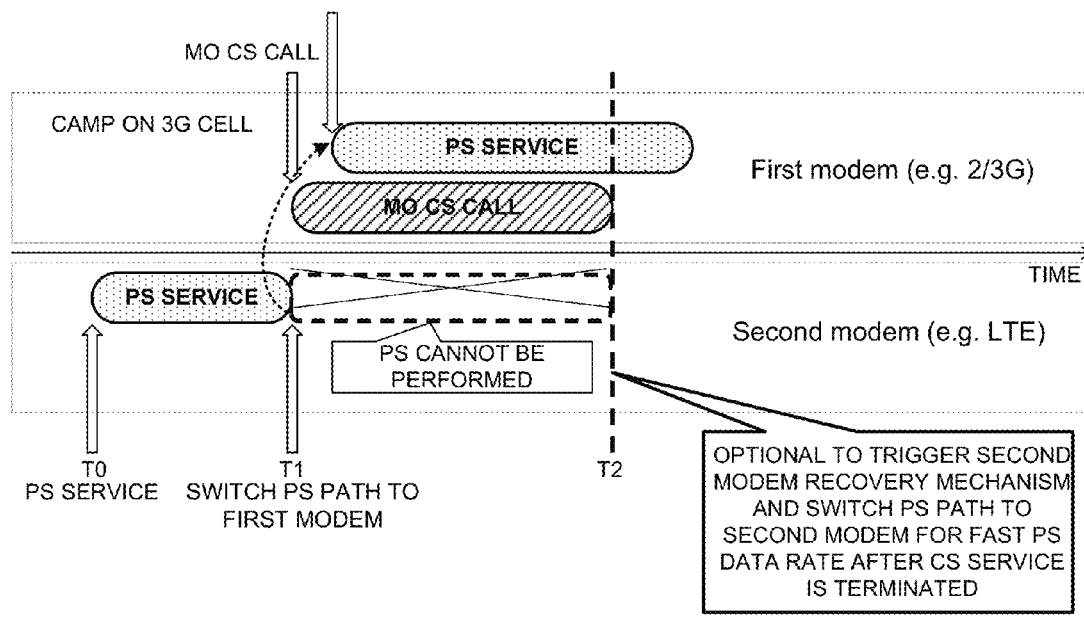
FIG. 5 illustrates embodiments PS path selection with ongoing PS service.

FIG. 5 illustrates embodiments PS path selection with ongoing PS service. In the example of FIG. 5, a UE is equipped with a first modem operated in 3G RAT for both PS and CS services, and a second modem operated in 4G RAT for PS only service. Initially, the UE camps on a 3G cell via the first modem for performing CS service, while the default PS path is selected to be via the second modem, e.g., the data interface is bind with the second modem so that the following data service can be routed through the second modem. At time T0, the UE establishes a PS connection for performing PS service via the second modem. At time T1, the UE initiates an MO CS call via the first modem. Because CS service has higher priority over PS service, UE temporarily suspends the PS service and starts to perform the MO CS call during time T1-T2 via the first modem. If the serving RAT (e.g., 3G) of the first modem is allowed to perform both CS and PS services, then it is possible for UE to perform both CS and PS services via the first modem during T1-T2.

In accordance with one novel aspect, the UE switches the PS path from the second modem to the first modem at time T1. As a result, the UE is able to resume the ongoing PS service while performing the MO CS call via the first modem during T1-T2. At time T2, the MO CS call is terminated. In accordance with one novel aspect, if the UE is able to maintain PS service continuity, then the UE may trigger the second modem recovery mechanism and switches the PS path back to the second modem at time T2 for fast PS data rate. On the other hand, if the UE does not able to maintain PS service continuity, then the UE may continue the ongoing PS service via the first modem and switches the PS path back to the second modem until after the ongoing PS service is completed. Note that PS service continuity may be maintained by retrieving previous registered PS context information via performing Location Registration (LR) (e.g. routing area updating (RAU) on 2G/3G or tracking area updating (TAU) on 4G). By selecting and switching the PS path properly, the UE is able to separate CS and PS service using different modems, to perform PS service with higher PS data rate, and to maintain PS service continuity while simultaneously performing higher priority CS service. Examples of PS path selection are now illustrated below with accompanying drawings.

Figure 6:
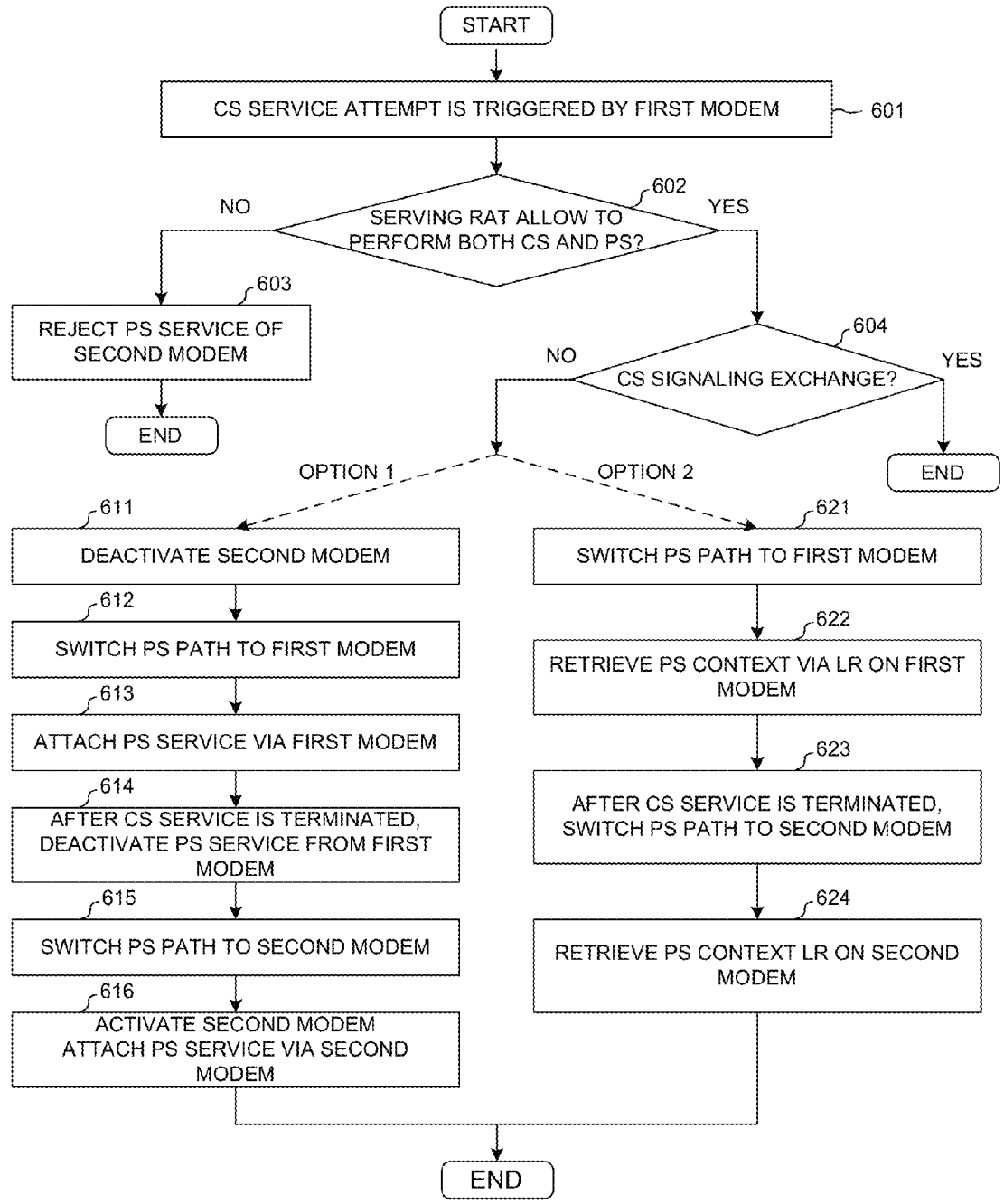
FIG. 6 is a flow chart of a method for PS path selection with no ongoing PS service.

FIG. 6 is a flow chart of a method for PS path selection with no ongoing PS service. A single SIM card with dual standby feature UE is equipped with a first modem operated in 2G/3G RAT for both PS and CS services, and a second modem operated in 4G RAT for PS only service. In step 601, the UE attempts to trigger CS service via the first modem in a serving RAT. In step 602, the UE determines whether the serving RAT allows both CS and PS services. If the answer is no, then the UE performs the CS service via the first modem and rejects any incoming PS service request from the second modem. If the answer is yes, then it is possible for the UE to perform both CS and PS services via the first modem after proper PS path selection. In step 604, the UE further determines whether the triggered CS service is CS call or CS signaling exchange. If the CS service is a type of CS signaling exchange, e.g., a mobility management (MM) location update (LU) procedure, then such signaling exchange normally only lasts for a short time period, e.g., less than two seconds. If that is the case, then the UE simply performs the CS service without further action. It is unnecessary for the UE to switch the PS path for only a short period of potential PS service interruption.

On the other hand, if the CS service is a type of CS call, e.g., either MT CS call or MO CS call, then the duration of such CS service is unknown. Accordingly, the UE initiates PS path selection to facilitate incoming PS service request. The UE has two options for such PS path selection. In option 1, in step 611, the UE deactivates the second modem and detaches from the network. In step 612, the UE switches the PS path from the second modem to the first modem. In step 613, the UE attaches to the network for PS service via the first modem. The UE then can perform incoming PS service during the CS call via the first modem. In step 614, after the CS call is terminated, the UE deactivates PS service from the first modem. In step 615, the UE switches the PS path back to the second modem. Finally, in step 616, the UE activates the second modem and attaches to the network via the second modem for fast data rate PS service.

In option 2, in step 621, the UE switches the PS path from the second modem to the first modem, which binds the UE data interface to the first modem. Note that the UE does not need to perform PS detach on the second modem. In step 622, the UE retrieves previous registered PS context by performing Location Registration (LR) (e.g. Routing Area Updating (RAU)) on the first modem. The PS context information may include registered temporary ID given by network (e.g., IP address), registered routing area ID, and some other parameter for mobility management. The UE then can perform incoming PS service during the CS call via the first modem. In step 623, after the CS call is terminated, the UE switches the PS path back to the second modem, which binds the UE data interface to the second modem. Finally, in step 624, the UE retrieves the previous PS context via LR (e.g. Tracking Area Updating (TAU)) on the second modem. The UE is then able to perform future PS service with fast data rate.

Figure 7:
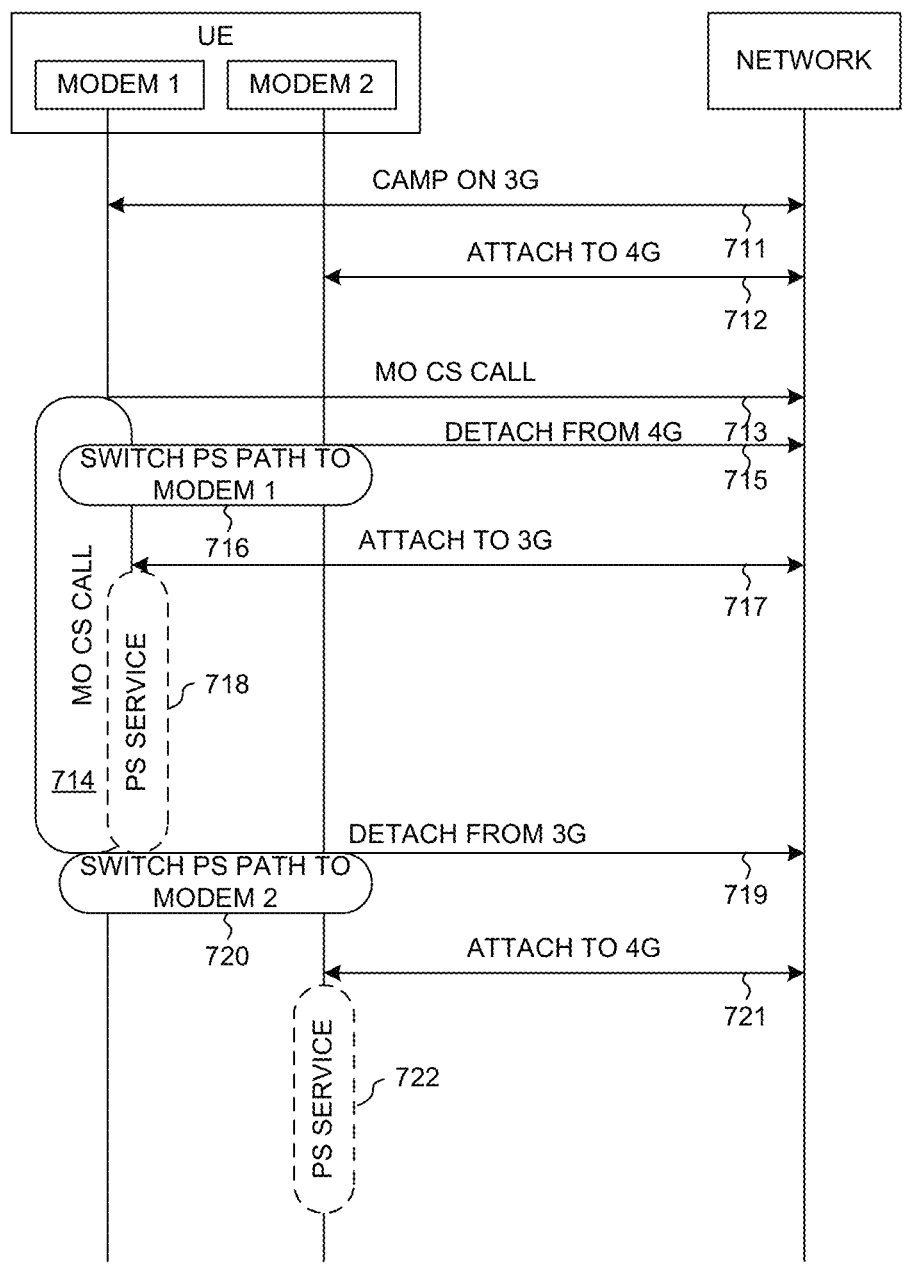
FIG. 7 illustrates a first embodiment of signaling procedure for PS path selection with no ongoing PS service.

FIG. 7 illustrates a first embodiment of signaling procedure for PS path selection with no ongoing PS service. For illustration purpose, the UE in FIG. 7 is the same as the UE in FIG. 6, and the first embodiment corresponds to option 1 in FIG. 6. In step 711, the UE camps on a 3G cell via Modem 1 (first modem). In step 712, the UE selects the default PS path to be via Modem 2 (second modem), and attaches to the network for 4G PS service via Modem 2. The attach procedure includes sending an attach request, receiving an attach accept message, and sending an attach complete message via 4G RAT. In step 713, the UE initiates an MO CS call via Modem 1. The UE then performs the MO CS call via Modem 1 during step 714. If Modem 1 allows both PS and CS services, then in step 715, the UE deactivates Modem 2 and detaches from the network. In step 716, the UE switches the PS path from Modem 2 to Modem 1. In step 717, the UE attaches to the network for 3G PS service via Modem 1. After successful attachment, the UE is able to perform incoming PS service via Modem 1 in step 718. After the CS call is terminated, in step 719, the UE detaches the PS service from the network. In step 720, the UE switches the PS path back to Modem 2. In step 721, the UE attaches to the network for 4G PS service via Modem 2. Finally, the UE is ready to perform 4G PS service via Modem (step 722).

Figure 8:
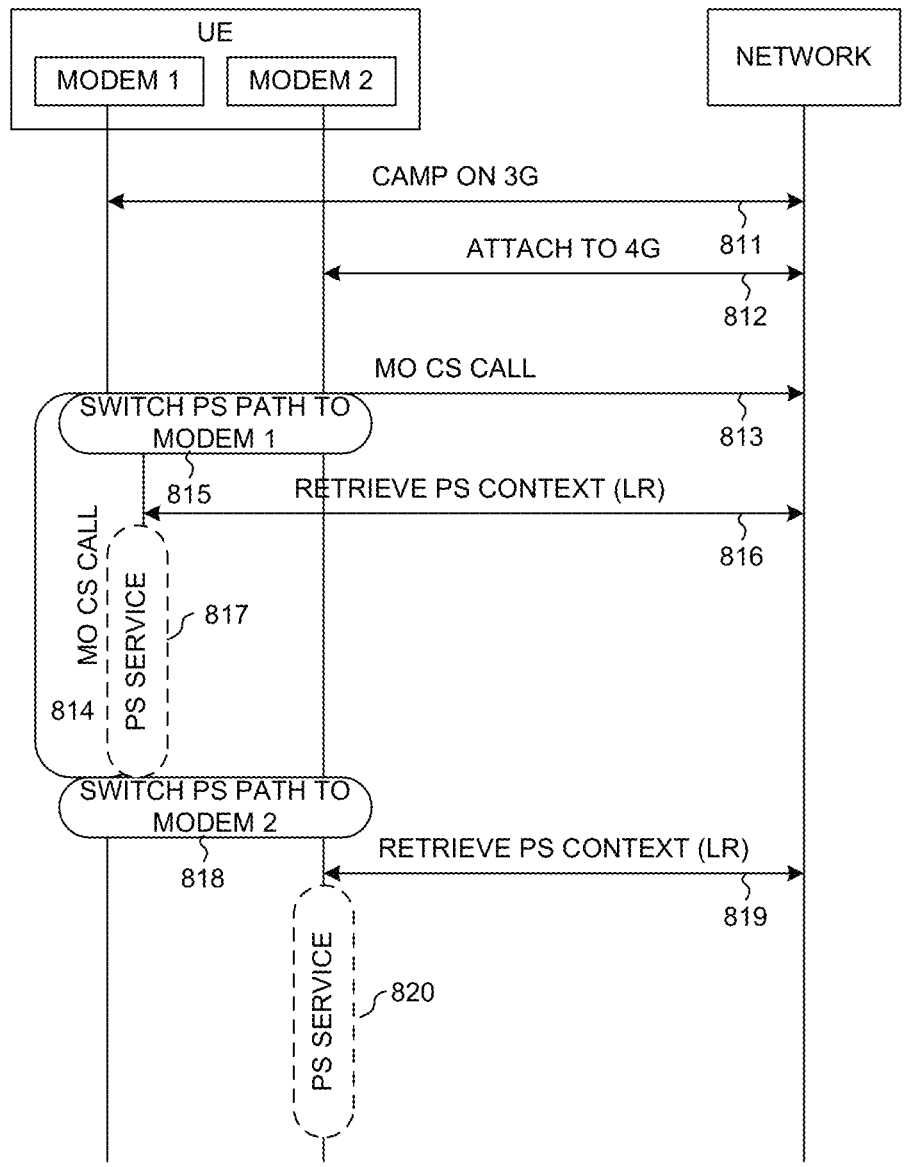
FIG. 8 illustrates a second embodiment of signaling procedure for PS path selection with no ongoing PS service.

FIG. 8 illustrates a second embodiment of signaling procedure for PS path selection with no ongoing PS service. For illustration purpose, the UE in FIG. 8 is the same as the UE in FIG. 6, and the second embodiment corresponds to option 2 in FIG. 6. In step 811, the UE camps on a 3G cell via Modem 1 (first modem). In step 812, the UE selects the default PS path to be via Modem 2 (second modem), and attaches to the network for 4G PS service via Modem 2. The attach procedure includes sending an attach request, receiving an attach accept message, and sending an attach complete message via 4G RAT. Upon attachment, the UE obtains PS context information including registered temporary ID given by network (e.g., IP address), registered routing area ID, and some other parameter for mobility management. In step 813, the UE initiates an MO CS call via Modem 1. The UE then performs the MO CS call via Modem 1 during step 814. If Modem 1 allows both PS and CS services, then in step 815, the UE switches the PS path from Modem 2 to Modem 1. In step 816, the UE retrieves previous registered PS context information by performing LR via Modem 1. After successful LR, the UE is able to perform incoming PS service via Modem 1 (step 817). After the CS call is terminated, in step 818, the UE switches the PS path back to Modem 2. In step 819, the UE retrieves the PS context by performing LR via Modem 2. Finally, the UE is ready to perform 4G PS service via Modem (step 722) after successful LR.

Figure 9:
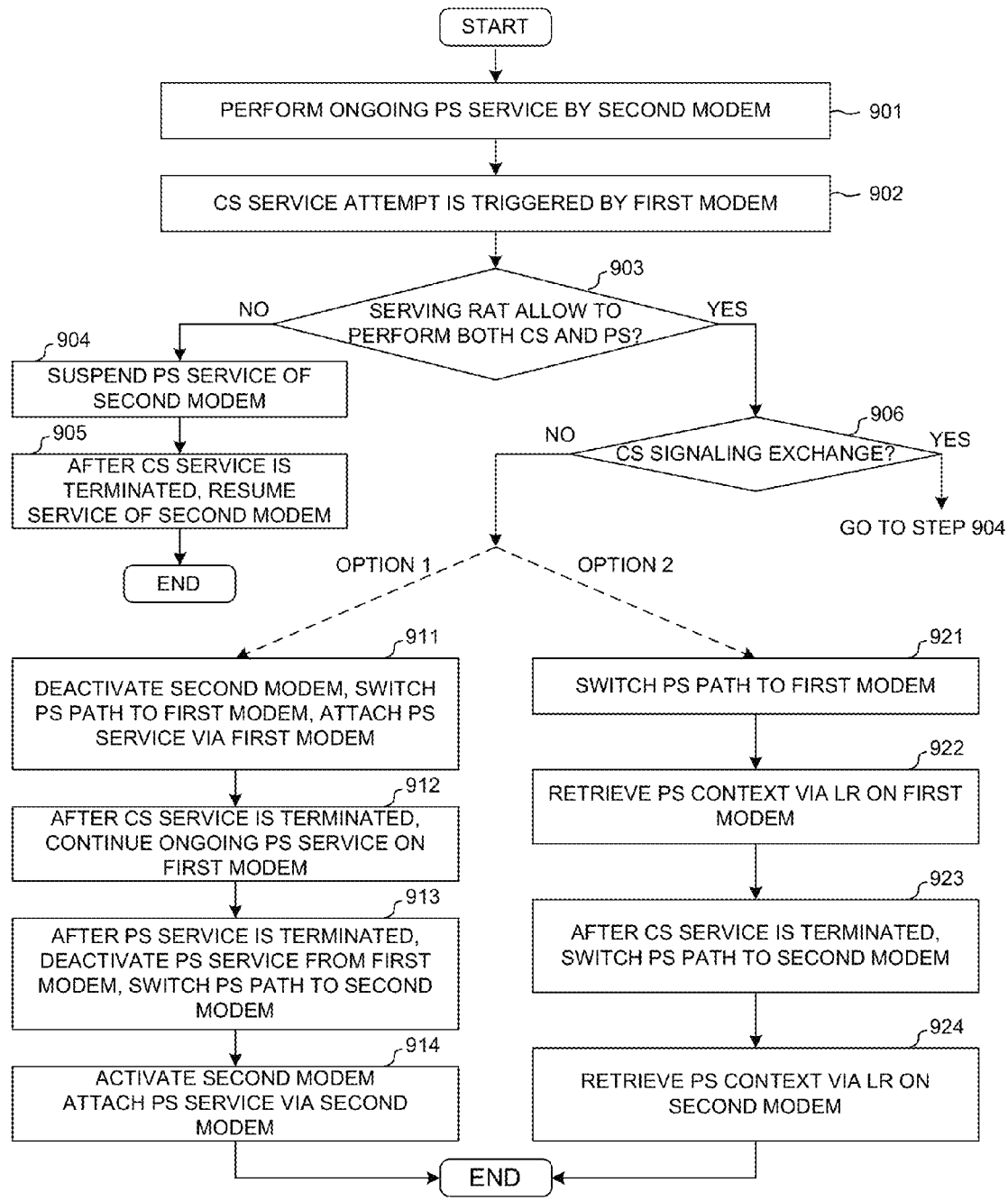
FIG. 9 is a flow chart of a method of PS path selection with ongoing PS service.

FIG. 9 is a flow chart of a method of PS path selection with ongoing PS service. A single SIM card with dual standby feature UE is equipped with a first modem operated in 2G/3G RAT for both PS and CS services, and a second modem operated in 4G RAT for PS only service. In step 901, the UE performs an ongoing 4G PS service via the second modem. In step 902, the UE attempts to trigger CS service via the first modem in a serving RAT. In step 903, the UE determines whether the serving RAT allows both CS and PS services. If the answer is no, then the UE performs the CS service via the first modem and suspends the current PS service (step 904).

After the CS service is terminated, the UE then resumes the ongoing PS service of the second modem. If the answer to step 903 is yes, then it is possible for the UE to perform both CS and PS services via the first modem after proper PS path selection. In step 906, the UE further determines whether the triggered CS service is CS call or CS signaling exchange. If the CS service is a type of CS signaling exchange, e.g., a mobility management (MM) location update (LU) procedure, then such signaling exchange normally only lasts for a short time period, e.g., less than two seconds. If that is the case, then the UE simply follows the same steps 904-905 without other further action. It is unnecessary for the UE to switch the PS path for only a short period of ongoing PS service interruption.

On the other hand, if the CS service is a type of CS call, e.g., either MT CS call or MO CS call, then the duration of such CS service is unknown. Accordingly, the UE initiates PS path selection to facilitate the current PS service. The UE has two options for the PS path selection. In option 1, in step 911, the UE deactivates the second modem and detaches from the network. The UE also switches the PS path from the second modem to the first modem and attaches to the network for 3G PS service via the first modem. The UE then performs both CS and PS services via the first modem. In step 912, after the CS call is terminated, the UE continues the ongoing PS service via the first modem. In step 913, after the ongoing PS service is terminated, the UE deactivates PS service from the first modem, switches the PS path back to the second modem. Finally, in step 914, the UE activates the second modem and attaches to the network for future 4G PS service with fast data rate. It can be seen that because the UE does not support retrieving PS context via LR, the triggering of the second modem recovery mechanism is waited until the PS service is completed for PS service continuity.

In option 2, in step 921, the UE switches the PS path from the second modem to the first modem, which binds the UE data interface to the first modem. Note that the UE does not need to perform PS detach on the second modem. In step 922, the UE retrieves previous registered PS context by performing LR on the first modem. The PS context information may include registered temporary ID given by network (e.g., IP address), registered routing area ID, and some other parameter for mobility management. The UE then performs both CS and PS services via the first modem. In step 923, after the CS call is terminated, the UE switches the PS path back to the second modem, which binds the UE data interface to the second modem. Finally, in step 924, the UE retrieves the previous PS context via LR on the second modem and resumes the ongoing PS service. It can be seen that because the UE supports retrieving PS context via LR, the UE is able to maintain PS service continuity after the PS path is switched to a different modem.

Figure 10:
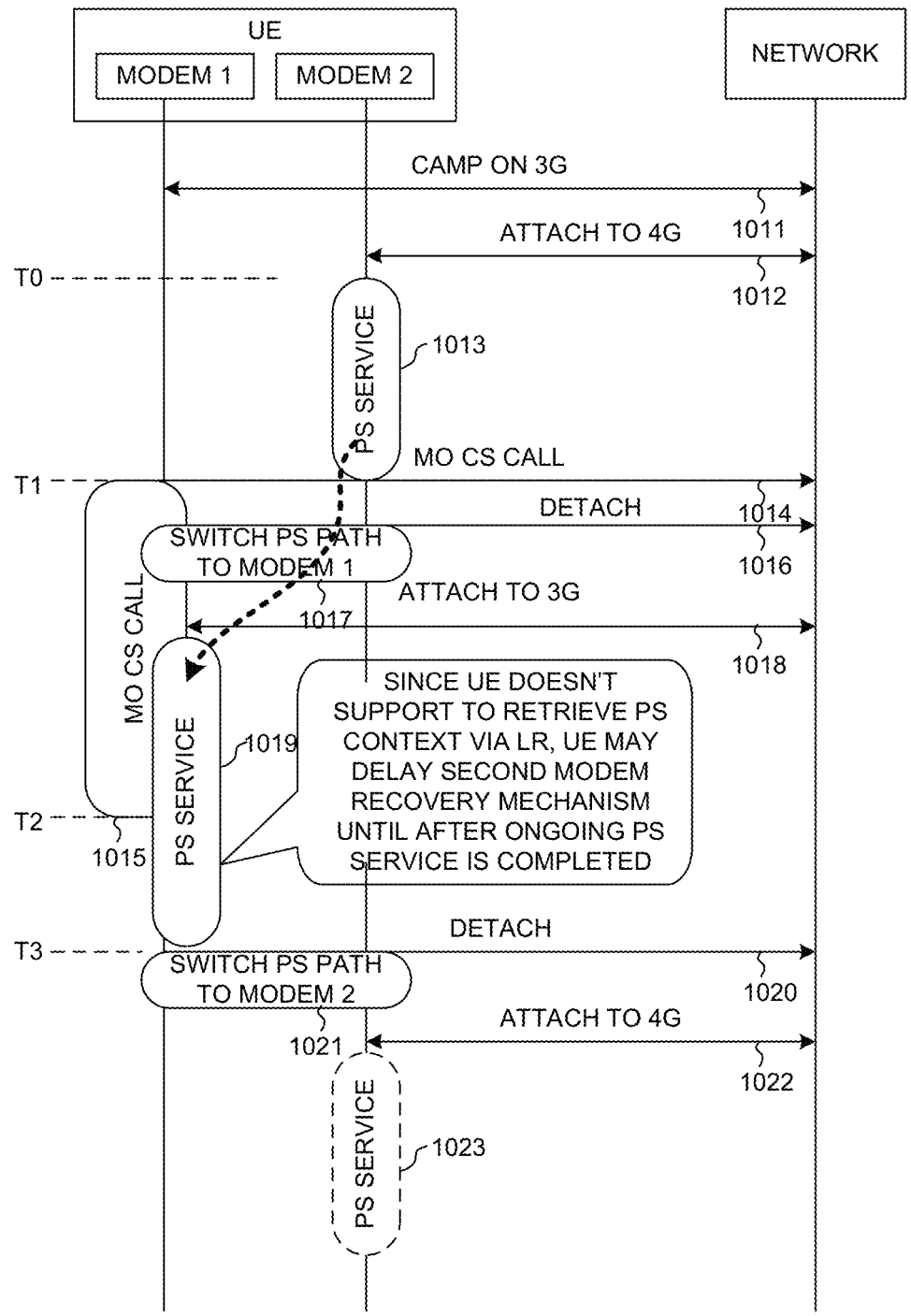
FIG. 10 illustrates a first embodiment of signaling procedure for PS path selection with ongoing PS service.

FIG. 10 illustrates a first embodiment of signaling procedure for PS path selection with ongoing PS service. For illustration purpose, the UE in FIG. 10 is the same as the UE in FIG. 9, and the first embodiment corresponds to option 1 in FIG. 9. In step 1011, the UE camps on a 3G cell via Modem 1 (first modem). In step 1012, the UE selects the default PS path to be via Modem 2 (second modem), and attaches to the network for 4G PS service via Modem 2. During step 1013, the UE performs PS service via Modem 2 from time T0. In step 1014, the UE initiates an MO CS call via Modem 1 at time T1. The UE then performs the MO CS call via Modem 1 during step 1015 because CS call has higher priority. If Modem 1 allows both PS and CS services, then in step 1016, the UE deactivates Modem 2 and detaches from the network. In step 1017, the UE switches the PS path from Modem 2 to Modem 1. In step 1018, the UE attaches to the network for 3G PS service via Modem 1. After successful attachment, the UE continues the PS service via Modem 1 during step 1019. After the CS call is terminated at time T2, the UE continues the PS service via Modem 1. This is because UE does not support RAU/TAU, and the UE may delay the second modem recovery mechanism to maintain the service continuity of the ongoing PS service. After the ongoing PS service is terminated at time T3, in step 1020, the UE detaches PS service from the network via Modem 1. In step 1021, the UE switches the PS path back to Modem 2. In step 1022, the UE attaches to the network for 4G PS service. Finally, the UE is ready to perform 4G PS service with fast data rate via Modem 2 (step 1023).

Figure 11:
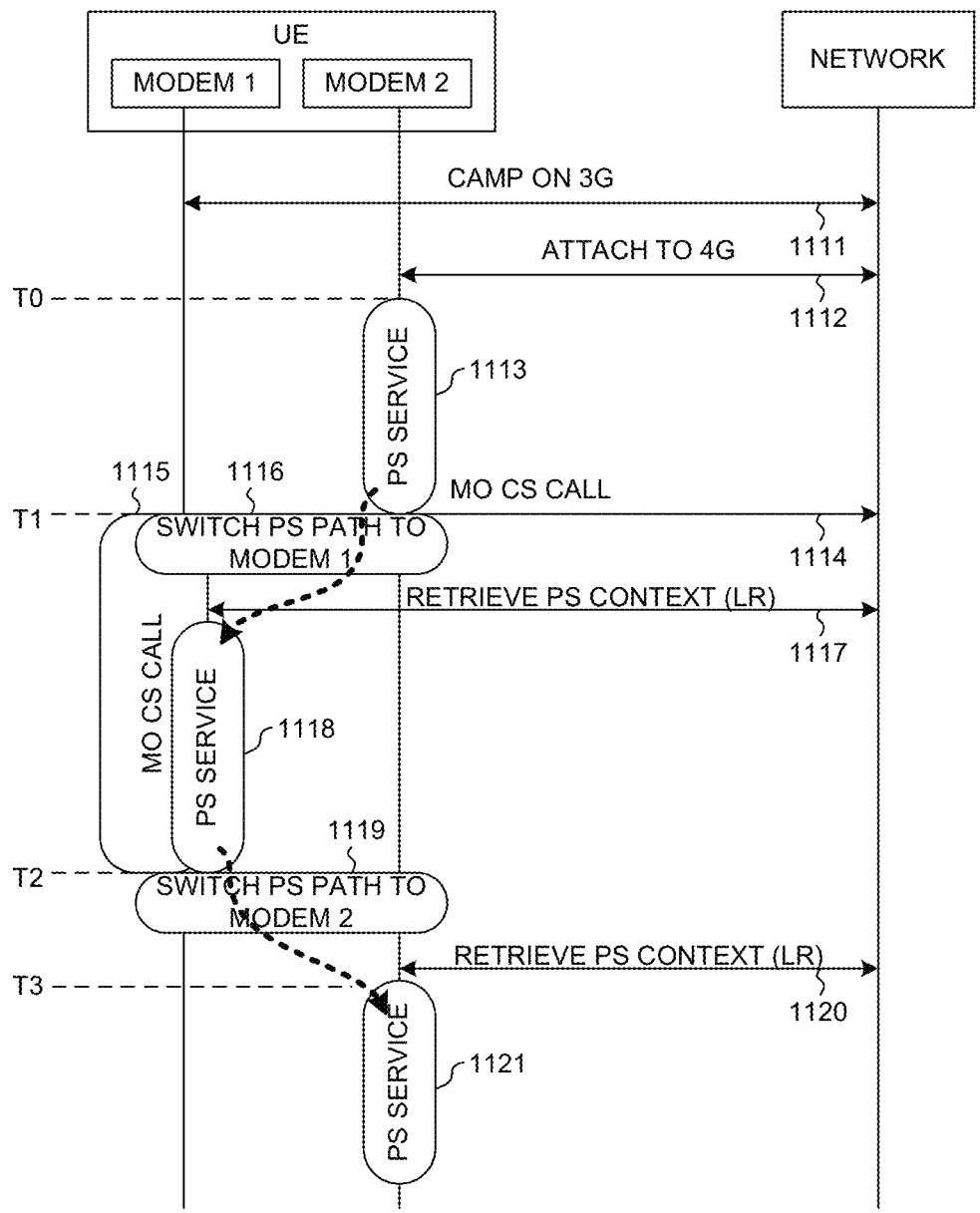
FIG. 11 illustrates a second embodiment of signaling procedure for PS path selection with ongoing PS service.

FIG. 11 illustrates a second embodiment of signaling procedure for PS path selection with ongoing PS service. For illustration purpose, the UE in FIG. 11 is the same as the UE in FIG. 9, and the second embodiment corresponds to option 2 in FIG. 9. In step 1111, the UE camps on a 3G cell via Modem 1 (first modem). In step 1112, the UE selects the default PS path to be via Modem 2 (second modem), and attaches to the network for 4G PS service via Modem 2. Upon attachment, the UE obtains PS context information including registered temporary ID given by network (e.g., IP address), registered routing area ID, and some other parameter for mobility management. During step 1113, the UE performs PS service via Modem 2 from time T0. In step 1114, the UE initiates an MO CS call via Modem 1 at time T1. The UE then performs the MO CS call via Modem 1 during step 1115 and suspends the PS service because CS call has higher priority. If Modem 1 allows both PS and CS services, then in step 1116, the UE switches the PS path from Modem 2 to Modem 1. In step 1117, the UE retrieves previous registered PS context information by performing LR via Modem 1. After successful LR, the UE resumes the ongoing PS service via Modem 1 (step 1118). After the CS call is terminated at time T2, in step 1119, the UE switches the PS path back to Modem 2. In step 1120, the UE retrieves the PS context by performing LR via Modem 2. Finally, the UE resumes the PS service via Modem 2 (step 1121) after successful LR. Because the UE supports retrieving PS context via LR, the UE is able to main PS continuity when the UE switches the PS path to different modems.

Figure 12:
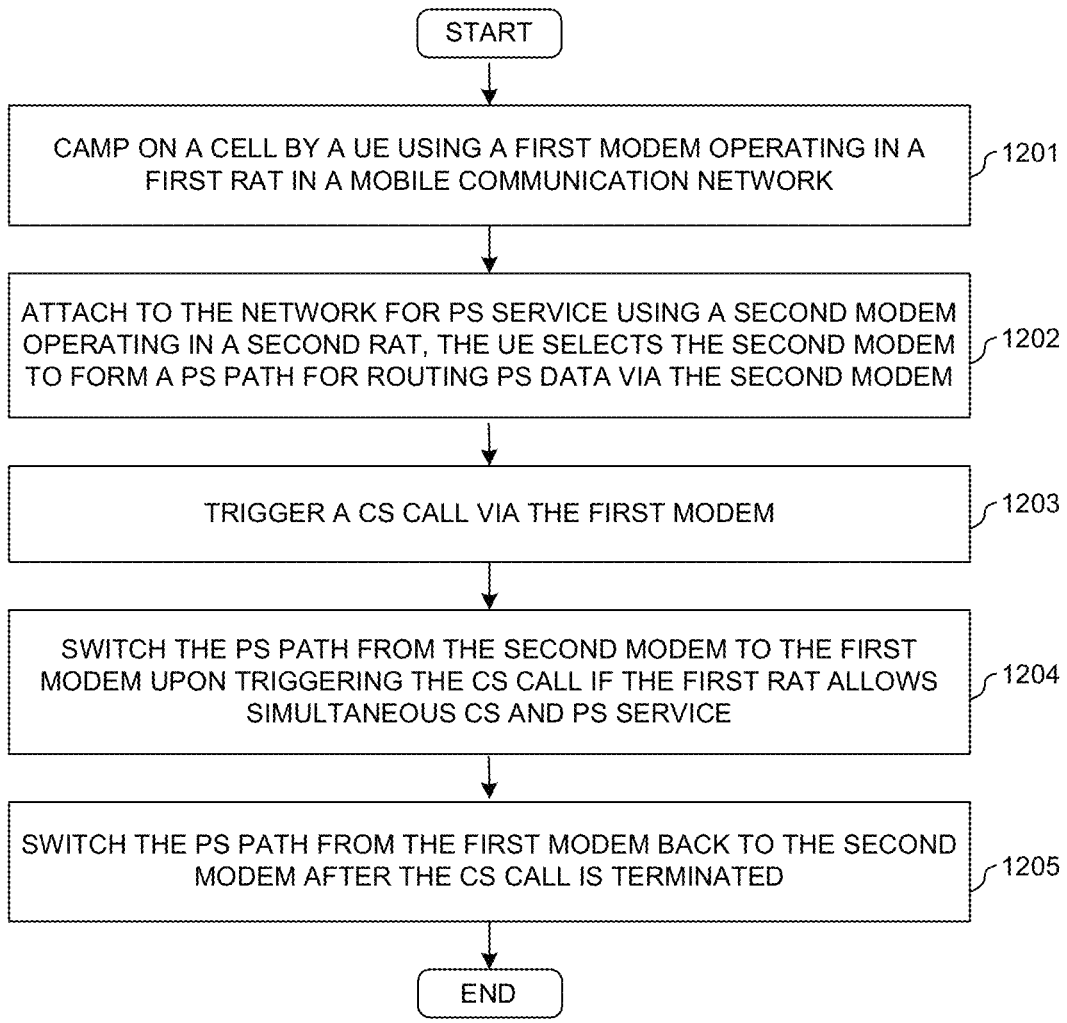
FIG. 12 is a flow chart of a method of PS path selection in accordance with one novel aspect.

FIG. 12 is a flow chart of a method of PS path selection in accordance with one novel aspect. A single SIM card with dual standby feature UE is equipped with a first modem operated in 2G/3G RAT for both PS and CS services, and a second modem operated in 4G RAT for PS only service. In step 1201, the UE camps on a cell using the first modem operated in 2G/3G RAT in a mobile communication network. In step 1202, the UE attaches to the network for PS service using the second modem operated in 4G RAT. The UE selects the second modem to form a PS path for routing PS data via the second modem. In step 1203, the UE triggers CS service via the first modem. In step 1204, the UE switches the PS path from the second modem to the first modem upon triggering the CS service if the first modem allows simultaneous PS and CS service. In step 1205, after the CS service is terminated, the UE optionally switches the PS path back to the second modem.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) camping on a cell by a user equipment (UE) using a first modem operating in a first radio access technology (RAT) in a mobile communication network;
   (b) attaching to the network for packet-switched (PS) service using a second modem operating in a second RAT, wherein the UE selects the second modem to form a PS path for routing PS data via the second modem;
   (c) triggering a circuit-switched (CS) call via the first modem;
   (d) deactivating the second modem so as to detach from the network for PS service and attaching to the network for PS service using the first modem; and
   (e) switching the PS path from the second modem to the first modem upon triggering the CS call.

2. The method of claim 1, wherein the first RAT supports both CS and PS service, wherein the second RAT supports PS service with a faster PS data rate.

3. The method of claim 1, wherein the UE is equipped with a single radio frequency transceiver and a single Universal Subscriber Identity Module (USIM) card.

4. The method of claim 1, wherein CS service has a higher priority than does the PS service.

5. The method of claim 1, wherein the UE does not support retrieving PS context information via Location Registration.

6. The method of claim 1, further comprising:
   (f) performing PS data transmission via the first modem while performing the CS call; and
   (g) continuing the ongoing PS data transmission via the first modem upon the CS call being terminated.

7. The method of claim 1, wherein the UE does not switch the PS path if a CS signaling exchange, instead of the CS call, is triggered via the first modem.

8. A method, comprising:
   (a) camping on a cell by a user equipment (UE) using a first modem operating in a first radio access technology (RAT) in a mobile communication network;
   (b) attaching to the network for packet-switched (PS) service using a second modem operating in a second RAT, wherein the UE selects the second modem to form a PS path for routing PS data via the second modem;
   (c) triggering a circuit-switched (CS) call via the first modem;
   (d) retrieving PS context information using the first modem by performing Location Registration; and
   (e) switching the PS path from the second modem to the first modem upon triggering the CS call.

9. The method of claim 8, wherein PS service continuity is maintained from the second modem to the first modem.

10. The method of claim 8, further comprising:
    (f) performing PS data transmission via the first modem while performing the CS call;
    (g) switching the PS path from the first modem back to the second modem after the CS call is terminated; and
    (h) continuing the ongoing PS data transmission via the second modem.

11. A user equipment (UE), comprising:
    a first modem that camps on a cell via a first radio access technology (RAT) in a mobile communication network, wherein the first modem triggers a circuit-switched (CS) call;
    a second modem that attaches to the network via a second RAT for packet-switched (PS) service, wherein the UE selects the second modem to form a PS path for routing PS data via the second modem;

a radio frequency scheduler (RFS) that schedules radio resources to be shared between the first modem and the second modem; and a configuration module that deactivates the second modem, attaches to the network for PS service using the first modem, and switches the PS path from the second modem to the first modem upon triggering the CS call.

12. The UE of claim 11, wherein the first RAT supports both CS and PS service, wherein the second RAT supports PS service with a faster PS data rate.

13. The UE of claim 11, wherein the UE is equipped with a single radio frequency transceiver and a single Universal Subscriber Identity Module (USIM) card.

14. The UE of claim 11, wherein CS service has a higher priority than PS service.

15. The UE of claim 11, wherein the UE does not support retrieving PS context information by performing location registration.

16. The UE of claim 11, wherein the first modem performs PS data transmission while performing the CS call, and wherein the first modem continues the ongoing PS data transmission upon the CS call being terminated.

17. The UE of claim 11, wherein the UE does not switch the PS path if a CS signaling exchange, instead of the CS call, is triggered via the first modem.

18. A user equipment (UE), comprising:
a first modem that camps on a cell via a first radio access technology (RAT) in a mobile communication network, wherein the first modem triggers a circuit-switched (CS) call;

a second modem that attaches to the network via a second RAT for packet-switched (PS) service, wherein the UE selects the second modem to form a PS path for routing PS data via the second modem;

a radio frequency scheduler (RFS) that schedules radio resources to be shared between the first modem and the second modem; and a configuration module that switches the PS path from the second modem to the first modem upon triggering the CS call, wherein the switching of the PS path involves retrieving PS context information using the first modem by performing Location Registration (LR).

19. The UE of claim 18, wherein PS service continuity is maintained from the second modem to the first modem.

20. The UE of claim 18, wherein the first modem performs PS data transmission while performing the CS call, wherein the UE switches the PS path from the first modem back to the second modem after the CS call is terminated, and wherein the second modem continues the ongoing PS data transmission.

* * * * *